Figure 1:
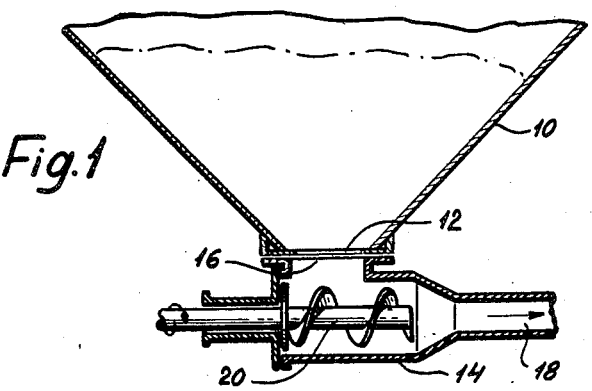

Feb. 4, 1958 P. S. KNUDSEN 2,822,152
APPARATUS FOR REMOVING BUTTER FROM THE CONTAINERS
OF COMBINED CHURNS AND BUTTER-WORKERS
Filed Aug. 10, 1954 4 Sheets-Sheet 1

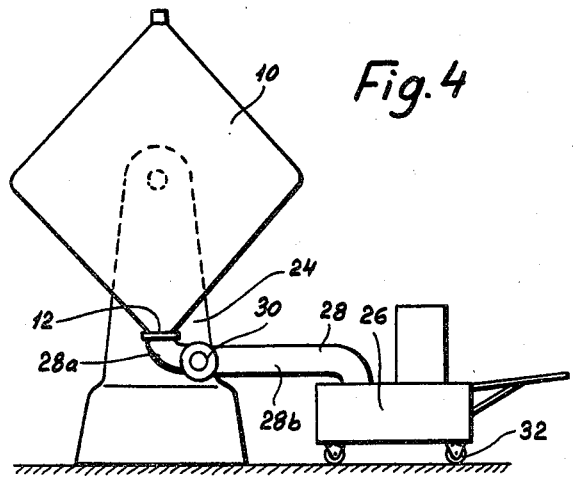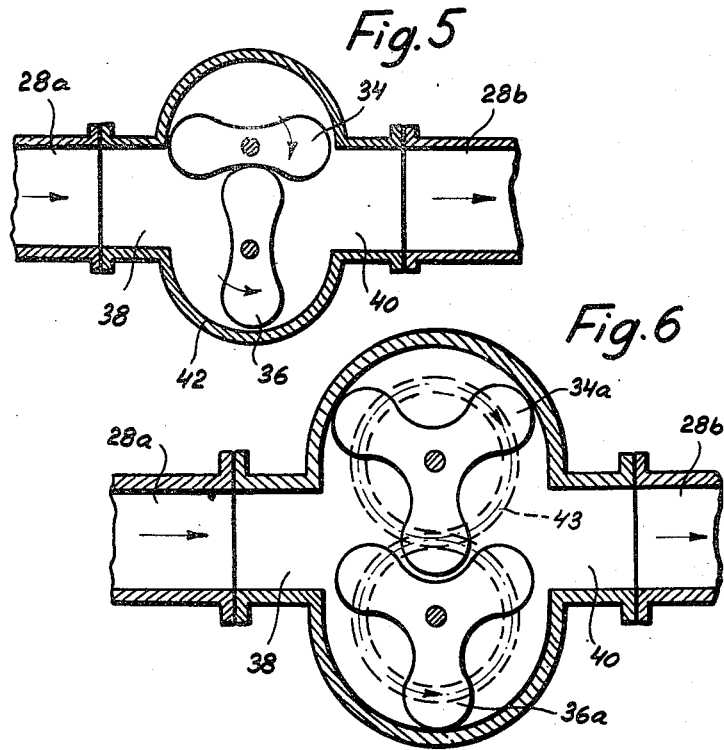

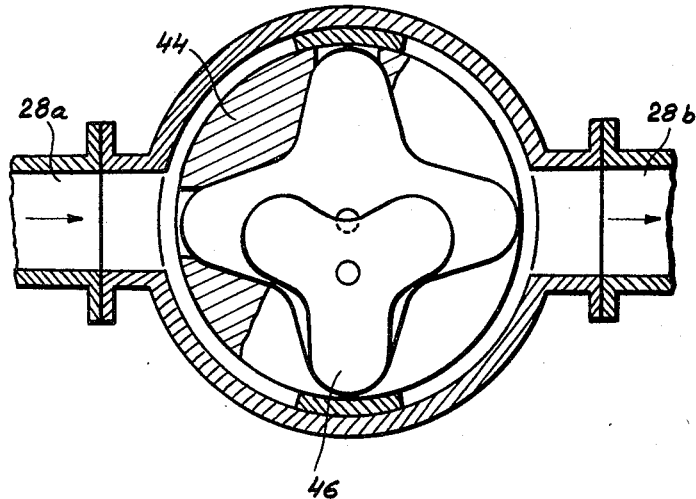
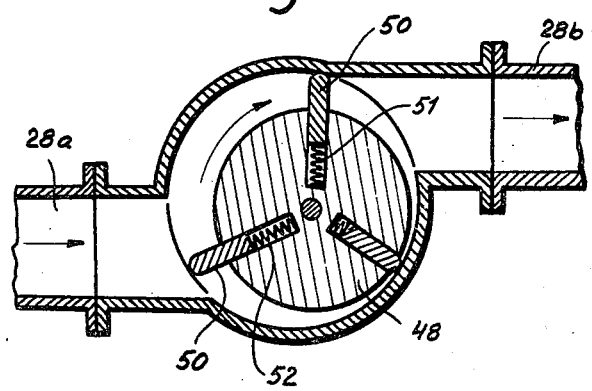

Feb. 4, 1958  P. S. KNUDSEN  2,822,152
APPARATUS FOR REMOVING BUTTER FROM THE CONTAINERS
OF COMBINED CHURNS AND BUTTER-WORKERS
Filed Aug. 10, 1954  4 Sheets-Sheet 4

United States Patent Office 2,822,152
Patented Feb. 4, 1958

2,822,152
APPARATUS FOR REMOVING BUTTER FROM THE CONTAINERS OF COMBINED CHURNS AND BUTTER-WORKERS

Peter Skjøde Knudsen, Kolding, Denmark

Application August 10, 1954, Serial No. 448,971

Claims priority, application Denmark August 14, 1953

10 Claims. (Cl. 259—30)

The present invention relates to an apparatus for removing butter from the containers of combined churns and butterworkers.

To facilitate the removal of butter from the containers of combined churns and butter-workers it has been suggested to heat the butter so as to soften the butter mass in order that the latter may be pressed out of the container within a reasonable time, a slight positive pressure being maintained therein the while. Experiments have proved, however, that rather narrow limits are set to the temperature to which the butter may be heated, as excessive temperatures will result in an undesirable texture of the butter.

This having been recognized, several difficulties were encountered in finding a satisfactory apparatus for removing the butter. It has been attempted to improve the removal by increasing the pressure in the combined churn and butter-worker, so as to compensate by this means for a reduced discharge temperature. It is true that the butter could thereby be pressed out with no great difficulty, but on the other hand it had to be recognized before long that also the process of ejecting the butter by means of increased positive pressure still required a comparatively high discharge temperature, as otherwise there was a risk that the air might escape through the butter mass without removing the butter.

Another possibility of removing the butter while obviating the disadvantages demonstrated in the foregoing is to provide the container with a rather large discharge opening. In this case it is possible to operate with comparatively slight or even no positive pressure and with low discharge temperature. The container can be practically completely emptied, seeing that—as actually practised—all the butter can be conveyed to the discharge opening e. g. by means of a spade or a rubber scraper or else by use of the hands. Such a process, however, is inconvenient as well as insanitary, quite apart from the fact that in practice this method is suitable for drawing off the butter into casks or butter transport vehicles only, whereby the combined churn and butter-worker must be so suspended that the casks or vehicles can be placed below the container.

It is an object of the present invention to provide an apparatus for removing butter, wherein the butter can uninterruptedly be removed from the container of the combined churn and butter-worker at a reasonable discharge temperature.

It is also among the objects of the invention to provide an apparatus for carrying out the method by means of which the butter may be positively removed from the container of the combined churn and butter-worker and be positively delivered from said apparatus.

The method according to the invention is applicable to the removal of butter from the container of a churn and butter-worker, having a discharge opening which changes its position during the rotation of the container, the said rotation being so stopped that the discharge opening is positioned in the lowermost part of the container, so that the butter is juxtaposed said opening by gravity, and the butter being removed through the discharge opening by means of emptying apparatus. The characteristic feature according to the invention, whereby the above objects are substantially attained, consists in a positive removal of the butter from the container by means of rotating mechanical removing members.

By this method there is obtained a forced positive removal of the butter from the container, so that the latter can be emptied uniformly and safely and at a reasonable discharge temperature. In experiments, which have been carried through, this temperature has been 4–5° C. below the temperature necessary for ejecting the butter by means of positive pressure in the container, conditions being equal.

According to the invention there is obtained a particularly advantageous operational method by using for removing purposes such rotating mechanical members as operate on the principle of rotary pumps. This method assures the provision in a most profitable manner of a string of butter of homogeneous composition and texture when leaving the removing members.

The invention also relates to apparatus for carrying the method into effect. This apparatus is characteristic in that it comprises a housing with an inlet, where the housing is designed to be in connection with the discharge opening of the container, and with an outlet, and with at least one shaped rotatable member disposed in the housing, the profile of which said member is so designed that it is capable of conveying butter from the discharge opening to the outlet, when the member is rotated.

If the apparatus operates on the principle of the rotary pump, the shaped rotatable members according to the invention are pump members, which together with the housing constitute a rotary pump. Whether the apparatus works on the rotary pump principle or not, the shaped rotatable members may be of different forms so as to convey butter from the discharge opening to the outlet of the housing in the most suitable way as dictated by the desired execution of the conveyance.

Especially the application of the rotary pump principle to the removal of butter from the combined container of a churn and butter-worker involves a possibility of imparting to the string of butter leaving through the outlet a certain pressure, so that the string is safely and positively conveyed to its destination, seeing that according to the invention especially a rotary pump may be designed to exert a substantial pressure during rotation on the butter leaving through the outlet. This advantage may e. g. be exploited for conveying the butter direct from the container to the measuring chamber of an automatic butter-packing machine. The feed worms usually employed in such packing machines may thereby be omitted, so that the construction of the packing machine is simplified.

In such an arrangement the packing machine will thus be in direct and uninterrupted connection during the packing of the butter with the container of the combined churn and butter-worker, until the desired quantity has been packed. Thereby the advantage is obtained that the butter can be stored in the container, until it is supplied to the packing machine. The butter will thus not come into contact with the surrounding air, whereby the risk of contaminating the butter is diminished.

Experience has shown that the mass of butter in the container of a combined churn and butter-worker is rather soft and plastic at the end of the butter-working operation, and that this consistence is practically the same as the one with which good processing results can be obtained in modern automatic butter-packing machines, operating with warm butter, i. e. butter having a temperature between approximately 15 and 20° C. and preferably between 18 and 19° C. As the butter may remain in the container as mentioned in the foregoing, and as the temperature of the contents may be regulated e. g. by irrigation with warm water, the advantageous soft and plastic consistence of the butter can be maintained, until the butter is removed from the container for subsequent processing in the packing machine.

Especially the application of the rotary pump principle to the removal of butter also involves a possibility for an efficacious emptying of the container, as the apparatus according to the invention may be designed to produce during the rotation a pressure substantially below the atmospheric at the feed end, whereby a positive influence is exerted on the removal of butter from the container and the supply of butter to the apparatus. The apparatus can thereby also be advantageously utilized for safe removal of comparatively cold and stiff butter, if e. g. a type of packing machine is used which is adapted for such operational conditions.

In principle it is without importance which type of apparatus is used, but it is natural to choose a construction which under predetermined operational conditions ensures good processing results at a lenient treatment of the butter. If an apparatus is employed which operates on the rotary pump principle this apparatus in a preferred embodiment of the invention may be a gear pump with pump members having few teeth, preferably two or three only. According to the invention such members can furthermore be driven in interdependence by means of a positive gearing, e. g. a toothed gearing, disposed outside the pump casing.

The limitation of the number of teeth assures an effective conveying of butter whilst simultaneously obviating the risk of overdoing the processing of the butter during its passage through the pump. Moreover, the small number of teeth facilitates the cleaning of the pump. As the pump teeth may be adapted to not to drive one another direct, but may be rotated interdependently by means of said suitable gearing disposed outside the pump casing, the teeth of the pump members can be prevented during operation from abutting or pressing against one another, whereby the texture of jammed-up butter might be damaged.

In an apparatus which does not operate on the principle of rotary pumps the shaped member according to the invention may be in the form of a worm or propeller.

At a suitable dimensioning and operational speed of the apparatus the butter passing therethrough may be subjected to a certain kneading effect, especially when an apparatus is chosen the rotatable member of which is a screw member. Such a kneading effect may be advantageous for an equalization of the distribution of moisture in the butter.

Figure 2:
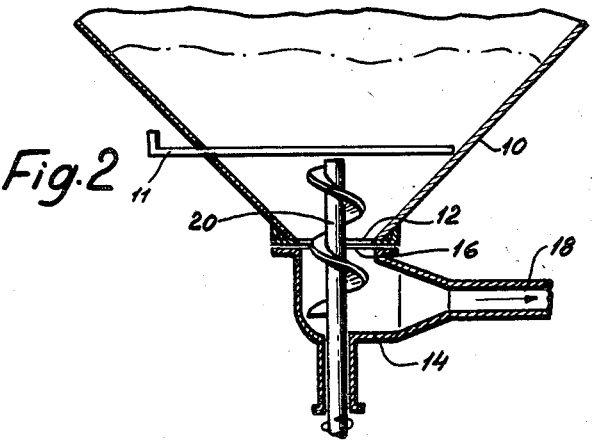
Figure 3:
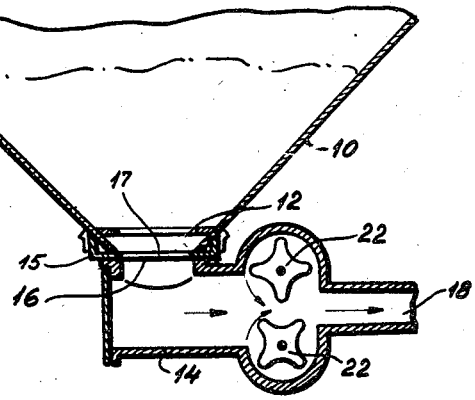

Preferred embodiments of apparatus according to the invention will now be described with reference to the drawings, wherein:

Fig. 1 shows schematically a transverse section through the discharge end of a churn and butter-worker with removing apparatus fitted thereto, said apparatus being provided with a worm, the axis of rotation of which is disposed in a plane parallel with the plane of the discharge opening of the churn and butter-worker, Fig. 2 is schematically a transverse section through the discharge end of a churn and butter-worker with removing apparatus fitted thereto, said apparatus being provided with a worm, the axis of rotation of which is disposed at right angles to the plane of the discharge opening of the churn and butter-worker, Fig. 3 shows schematically a transverse section through the discharge end of a churn and butter-worker with removing apparatus fitted thereto, said apparatus being provided with two coacting removing rollers of star-shaped cross section, and the axes of rotation of the rollers being disposed in planes parallel with the plane of the discharge opening of the churn and butter-worker, Fig. 4 illustrates an arrangement of the container of a churn and butter-worker with a rotary pump coupled thereto, said pump feeding a butter-packing machine, and Figs. 5–10 are schematically different constructional forms of the rotary pump.

As appears from Fig. 1 the container 10 of a churn and butter-worker is provided with a discharge opening 12, under which there is disposed apparatus for removing the butter. The said apparatus comprises a housing 14, which is provided with an inlet 16 and an outlet 18. At the inlet 16 the apparatus may be connected to the churn and butter-worker 10 in any suitable manner so as to communicate with said discharge opening 12. In the housing 14 there is mounted a conveyer worm 20. The worm is driven by means of a separate motor, not shown.

When the butter-working has been finished and the churn 10 stopped, the removing apparatus is placed in front of the discharge opening 12 of the churn and butter-worker, which is opened. It is expedient to fit the apparatus in a position of the container, wherein the discharge opening is located at a height convenient for the fitting of the removing apparatus and wherein the lump of butter is located below the discharge opening. Thereby it is possible to avoid barring devices, which should otherwise be present to prevent the butter from escaping through the discharge opening during the fitting of the apparatus. Thereupon the container is turned still more, so that the lump of butter is juxtaposed to the discharge opening, and the worm motor is started. Impelled by its own weight the butter will travel downwardly to the worm 20, which will force the butter through the outlet 18 of the housing 14.

In the embodiment shown in Fig. 2 the worm 20 is arranged in such a manner that it extends perpendicular to the plane of the discharge opening 12 and through said opening a distance into the container 10. During removal the butter will be passed to the outlet 18, partly by its own weight and partly by the traction exerted by said worm.

It will be understood that instead of a single worm it is also possible to use two or more worms, if necessary.

In the embodiment of the invention shown in Fig. 3 there is used a pair of conveyer rollers 22 instead of a worm, said rollers having star-shaped cross section. Said rollers may be rotated in opposite directions as shown by arrows about axis parallel to the plane of the discharge opening 12.

It is also possible instead of a worm or a conveyer roller to use a propeller, commonly known and therefore not shown, the blades of which are so disposed that the butter during the rotation of the propeller is conveyed from the churn and butter-worker 10 to the outlet 18 of the removing apparatus. The axis of rotation of the propeller may thereby be disposed at right angles to or parallel with the plane of the discharge opening, as desired.

In Fig. 4 there is shown a container 10 of a churn and butter-worker, suspended between uprights 24, one of which is provided with the driving gear of the churn and butter-worker. An automatic butter-packing machine 26 is provided with a measuring chamber, known per se and not shown, and between the measuring chamber and the discharge opening 12 of the container there is disposed a pipe 28 having sections 28a and 28b. A rotary pump 30 is coupled into the said pipe. Constructional forms of this pump will be described in detail in the following.

The pipe 28 may be rigid or, with a view to convenient fitting it might be flexible or at least provided with one or more bendable sections. If desired the pipe may also be designed as or comprise a telescopic member.

The packing machine 26 is provided with wheels 32, so that the machine can be wheeled up to the container 10, when the latter has been stopped and the removal of butter is about to begin. If the container 10 is positioned at a sufficient height above the floor, the packing machine 26 with its measuring chamber can be wheeled to a position below the container 10, so that the pipe-section 28b can be dispensed with and the butter can enter the measuring chamber of the packing machine direct from the outlet of the rotary pump 30.

The rotary pump 30 is so designed that it exerts a substantial pressure on the string of butter being removed, so that the butter is effectively and safely conducted to the measuring chamber of the butter-packing machine 26. Thus, it is unnecessary to provide the packing machine with feed worms. To facilitate the filling of the measuring chamber a pressure below the atmospheric can be created therein.

Butter-packing machines are provided which require supply of butter in step with the operational rhythm of the packing mechanism. If such packing machines are to be supplied with butter, the rotary pump may be so arranged as to supply butter to the machine in synchronization with the operation of the packing mechanism.

It will be understood that for the same purpose an apparatus of the nature shown in Figs. 1–3 can be fitted instead of the rotary pump 30.

The rotary pump 30 is fitted on the container 10 in a manner similar to that of the apparatus described in connection with Fig. 1.

If so desired, the rotary pump may be of a type which is capable of creating a pressure substantially below the atmospheric at the inlet of the pump, so that the butter is subjected to a traction, whereby the butter can be safely and effectively removed from the container 10 and supplied to the rotary pump.

The rotary pumps employed may be of different types, depending upon the output required and whether the butter is to be supplied to the pump by the own weight of the butter or by traction or by both.

In Fig. 5 there is shown a gear pump with two pump members 34 and 36, each of which is provided with two teeth. The pump members are rotatably mounted in a pump housing 42 provided with an inlet 38 and an outlet 40.

Fig. 6 shows a similar pump with pump members 34a and 36a, each of which is provided with three teeth.

Fig. 7 shows another type of gear pump with a pump member 44 having internal toothing, and a pump member 46 having external toothing. The pump member 46 constitutes the driving part of the pump.

All the gear pumps shown in the said figures are thus provided with pump members having few teeth only, so as to thereby ensure an efficient conveyance of the butter with no risk of overdoing the processing of the butter during its passage through the pump. The pump members are driven by a separate driving mechanism located outside the housing. Said mechanism comprises preferably a toothed gearing 43 as indicated in Fig. 6, so as to ensure a predetermined coaction between the pump members without any risk that the pump members are caused to press against one another, so that the butter which is thereby jammed up between the members suffers damage.

Fig. 8 shows a constructional form of the rotary pump with a pump member 48, which is excentrically mounted in the pump housing and provided with three wings 50 which are held in extended position by the power of springs 51, and which said wings are pushed outwardly and inwardly in recesses 52 during the rotation of the member 48 by sliding along the inner surface of the pump housing thus forming increasing and decreasing conveying chambers between each other.

Figure 9:
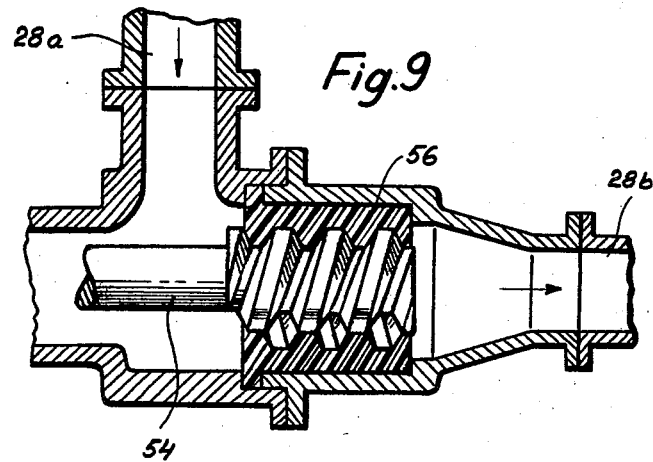

Fig. 9 a screw rotor 54 is eccentrically suspended, so shaped as a screw pump. Especially when screw pumps are used, the butter will during its passage through the pump housing be subjected to a certain amount of kneading, whereby the distribution of moisture in the butter can be improved.

In the constructional form of a screw pump shown in Fig. 9 a screw rotor 54 is excentrically suspended, so that during operation besides rotating about its own axis it may move to and fro between positions, wherein the rotor axis is disposed laterally of the longitudinal axis of the pump housing. The rotor is single-threaded and operates within a caoutchouc bushing 56 centrally disposed in the pump housing, which bushing is double-threaded.

Figure 10:
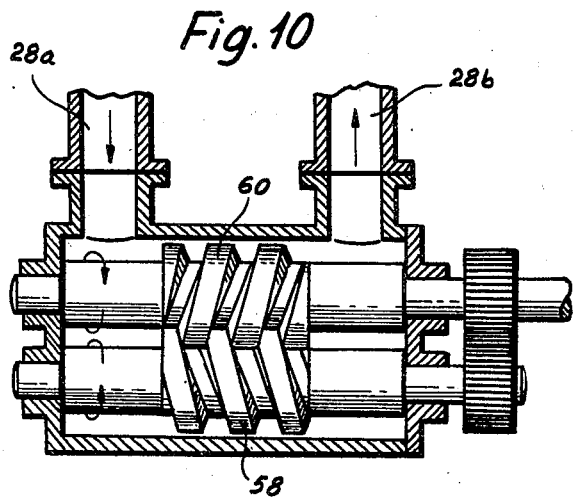

Fig. 10 shows a screw pump with two screw rotors 58 and 60 having right-hand and left-hand thread, respectively.

The shown types of rotary pumps are known per se and are, therefore, only shown quite schematically, as they shall not show constructional details but serve as examples only by means of which the positive mechanical removing of butter from combined churn and butter-workers may be effected, seeing that other types of rotary pumps may also be used to carry the invention into effect, e. g. such pumps as are provided with more than two screws, without departing from the invention. The axes of rotation of the pump members may be at right angles to the plane of the discharge opening 16, or else disposed in a plane which coincides with or extends parallel to the plane of the discharge opening, in a way substantially similar to that shown in Figs. 1–3.

It is possible to have the removing apparatuses permanently mounted on the container. During the churning and butter-working the apparatus may thereby be barred from the container by means of a suitable barring device, e. g. a slide gate 11 as schematically shown in Fig. 2.

Furthermore the removing apparatuses may be built together with a cover 15, vide Fig. 3. Said cover is provided with a passage 17 and in a suitable manner attached to the discharge end of the container. Discharge opening 12, passage 17 and inlet 16 are communicating with each other. Said cover 15 is together with its removing apparatus, detachable from the container 10.

It will be understood that the invention is not restricted to the shown embodiment, wherein the butter is passed from the container of a churn and butter-worker to an automatic packing machine. The invention can advantageously be utilized also in cases when the contents of the churn and butter-worker container has to be emptied into casks or e. g. into a transport vehicle, wherein the butter is to be stored for subsequent processing.

The mechanical removal of the butter from the churn and butter-worker involves that the string of butter thus formed has a uniform and smooth shape all over, whereas as the ejection by means of a positive pressure described in the foregoing undesired irregularities can be formed.

If necessary, the removal can be facilitated by creating a certain positive pressure in the churn and butter-worker 10.

The apparatuses according to the invention ensure a reliable and sanitary removal of the butter, whereby the latter can be passed into the packing without contact with human hands or the atmosphere.

The simple construction of the apparatuses permits a quick and convenient cleaning.

The removing apparatus according to the invention is designed for removing the butter into casks, butter vehicles or direct into butter-packing machines. During filling the casks are placed on a weighing machine, whereas butter which is filled into vehicles or packing machines is not weighed or measured.

Having thus fully described my invention I claim as new and desire to secure by Letters Patent:

1. Apparatus for removing butter from a rotatable container of a combined churn and butter-worker, comprising a discharge opening in said container, said opening being eccentrically disposed in relation to the axis of rotation of said container so as to change position during rotation thereof and being positionable as a result of said rotation at the lower portion of said container, a housing connected with said container to confine said discharge opening on the discharge side of said container, said housing being disposed in a position to receive butter brought to said opening by gravity and having an inlet and an outlet, said inlet communicating with said discharge opening, and rotatable profiled removing means lodged in said housing, said means being adapted to mechanically and positively remove butter through said opening and convey it to said outlet.

2. Apparatus for removing butter from a rotatable container of a combined churn and butter-worker, comprising a discharge opening in said container, said opening being eccentrically disposed in relation to the axis of rotation of said container so as to change position during rotation thereof and being positionable as a result of said rotation at the lower portion of said container, a housing connected with said container to confine said discharge opening on the discharge side of said container, said housing being disposed in a position to receive butter brought to said opening by gravity and having an inlet and an outlet, said inlet communicating with said discharge opening, and rotary pump means lodged in said housing, said means being adapted to positively remove butter through said opening and convey it to said outlet.

3. Apparatus for removing butter from a rotatable container of a combined churn and butter-worker, comprising a discharge opening in said container, said opening being eccentrically disposed in relation to the axis of rotation of said container so as to change position during rotation thereof and being positionable as a result of said rotation at the lower portion of said container, a housing connected with said container to confine said discharge opening on the discharge side of said container, said housing being disposed in a position to receive butter brought to said opening by gravity and having an inlet and an outlet, said inlet communicating with said discharge opening, and rotatable removing means lodged in said housing, said means being shaped as a worm, said worm being adapted to positively remove butter through said opening and convey it to said outlet.

4. Apparatus for removing butter from a rotatable container of a combined churn and butter-worker, comprising a discharge opening in said container, said opening being eccentrically disposed in relation to the axis of rotation of said container so as to change position during rotation thereof and being positionable as a result of said rotation at the lower portion of said container, a housing connected with said container to confine said discharge opening on the discharge side of said container, said housing being disposed in a position to receive butter brought to said opening by gravity and having an inlet and an outlet, said inlet communicating with said discharge opening, and rotatable removing means lodged in said housing, said means being shaped as a propeller, said propeller being adapted to positively remove butter through said opening and convey it to said outlet.

5. Apparatus for removing butter from a rotatable container of a combined churn and butter-worker, comprising a discharge opening in said container, said opening being eccentrically disposed in relation to the axis of rotation of said container so as to change position during rotation thereof and being positionable as a result of said rotation at the lower portion of said container, a housing connected with said container to confine said discharge opening on the discharge side of said container, said housing being disposed in a position to receive butter brought to said opening by gravity and having an inlet and an outlet, said inlet communicating with said discharge opening, and rotatable removing means lodged in said housing, said means being shaped as a roller with star shaped cross section, said roller being adapted to positively remove butter through said opening and convey it to said outlet.

6. Apparatus for removing butter from a rotatable container of a combined churn and butter-worker, comprising a discharge opening in said container, said opening being eccentrically disposed in relation to the axis of rotation of said container so as to change position during rotation thereof and being positionable as a result of said rotation at the lower portion of said container, a housing connected with said container to confine said discharge opening on the discharge side of said container, said housing being disposed in a position to receive butter brought to said opening by gravity and having an inlet and an outlet, said inlet communicating with said discharge opening, and rotatable removing means lodged in said housing, said means being shaped as a toothed wheel having few teeth, said wheel being adapted to positively remove butter through said opening and convey it to said outlet.

7. Apparatus for removing butter from a rotatable container of a combined churn and butter-worker, comprising a discharge opening in said container, said opening being eccentrically disposed in relation to the axis of rotation of said container so as to change position during rotation thereof and being positionable as a result of said rotation at the lower portion of said container, a housing connected with said container to confine said discharge opening on the discharge side of said container, said housing being disposed in a position to receive butter brought to said opening by gravity and having an inlet and an outlet, said inlet communicating with said discharge opening, rotatable removing means lodged in said housing, said means consisting of cooperating toothed wheels, and a separate gear mechanism connected with said toothed wheels for rotating said wheels, said mechanism being lodged outside said housing, said means being adapted to positively remove butter through said opening and convey it to said outlet.

8. Apparatus for removing butter from a rotatable container of a combined churn and butter-worker, comprising a discharge opening in said container, said opening being eccentrically disposed in relation to the axis of rotation of said container so as to change position during rotation thereof and being positionable as a result of said rotation at the lower portion of said container, a housing connected with said container to confine said discharge opening on the discharge side of said container, said housing being disposed in a position to receive butter brought to said opening by gravity and having an inlet and an outlet, said inlet communicating with said discharge opening, and rotatable profiled removing means lodged in said housing, the axis of rotation of said means being parallel to the plane of said discharge opening, said means being adapted to mechanically and positively remove butter through said opening and convey it to said outlet.

9. Apparatus for removing butter from a rotatable container of a combined churn and butter-worker, comprising a discharge opening in said container, said opening being eccentrically disposed in relation to the axis of rotation of said container so as to change position during rotation thereof and being positionable as a result of said rotation at the lower portion of said container, a removable barring device arranged at said opening, said device being adapted to shut said opening, a housing connected with said container to confine said discharge opening on the discharge side of said container, said housing being disposed in a position to receive butter brought to said opening by gravity and having an inlet and an outlet, said inlet communicating with said discharge opening, and rotatable profiled removing means lodged in said housing, said means being adapted to mechanically and positively remove butter through said opening and convey it to said outlet.

10. Apparatus for removing butter from a rotatable container of a combined churn and butter-worker, comprising a discharge opening in said container, said opening being eccentrically disposed in relation to the axis of rotation of said container so as to change position during rotation thereof and being positionable as a result of said rotation at the lower portion of said container, a cover for concealing said opening, a passage in said cover, said passage communicating with said discharge opening, a housing connected with said cover to confine said discharge opening on the discharge side of said container, said housing being disposed in a position to receive butter brought to said opening by gravity and having an inlet and an outlet, said inlet communicating with said passage, and rotatable profiled removing means lodged in said housing, said means being adapted to mechanically and positively remove butter through said opening and convey it to said outlet.

References Cited in the file of this patent

UNITED STATES PATENTS 943,603    De Lisle _____ Dec. 14, 1909

FOREIGN PATENTS 816,170    Germany _____ Oct. 8, 1905